United States Patent
Alcorn et al.

(10) Patent No.: US 7,063,615 B2
(45) Date of Patent: *Jun. 20, 2006

(54) ELECTRONIC GAMING APPARATUS WITH AUTHENTICATION

(75) Inventors: Allan E. Alcorn, Portola Valley, CA (US); Harry H. Jenkins, Knoxville, TX (US)

(73) Assignee: IGT, Reno, NV (US)

( * ) Notice: Subject to any disclaimer, the term of this patent is extended or adjusted under 35 U.S.C. 154(b) by 141 days.

This patent is subject to a terminal disclaimer.

(21) Appl. No.: 10/601,465

(22) Filed: Jun. 23, 2003

(65) Prior Publication Data

US 2004/0002381 A1    Jan. 1, 2004

Related U.S. Application Data

(63) Continuation of application No. 09/677,129, filed on Sep. 29, 2000, now Pat. No. 6,620,047, and a continuation-in-part of application No. 09/107,031, filed on Jun. 29, 1998, now Pat. No. 6,149,522, which is a continuation of application No. 08/864,700, filed on May 28, 1997, now abandoned, which is a continuation-in-part of application No. 08/981,882, filed as application No. PCT/US96/10463 on Jun. 17, 1996, now Pat. No. 6,106,396, which is a continuation-in-part of application No. 08/497,662, filed on Jun. 29, 1995, now Pat. No. 5,643,086.

(51) Int. Cl.
*A63F 9/24* (2006.01)

(52) U.S. Cl. .............. 463/1; 463/37; 463/20; 273/143 R

(58) Field of Classification Search ........ 463/1, 463/9, 11–13, 16–20, 25, 37, 29–30, 36, 40–43; 273/138.1, 138.2, 139, 236, 237, 143 R, 273/292–293; 345/173

See application file for complete search history.

(56) References Cited

U.S. PATENT DOCUMENTS

| 3,825,905 A | 7/1974 | Allen, Jr. ............. 340/172.5 |
| 3,838,264 A | 9/1974 | Maker .................... 235/153 |

(Continued)

FOREIGN PATENT DOCUMENTS

| EP | 0 685 246 | 12/1995 |

(Continued)

OTHER PUBLICATIONS

Bakhtiari, et al., "Cryptographic Hash Functions: A Survey," Centre for Computer Security Research, 1995, 3 introductory pages and pp. 1-26.

(Continued)

*Primary Examiner*—Mark Sager
(74) *Attorney, Agent, or Firm*—Beyer Weaver & Thomas LLP

(57) ABSTRACT

A gaming machine is provided with a cabinet, at least one user-interface button, a value-receiving mechanism associated with the cabinet, a display unit associated with the cabinet, a processor disposed in the cabinet, system software representing a game that may be played by a player, encoded data generated from at least one message digest that was generated based on using an encoding function with the system software, loading software stored in memory that loads system software into random-access memory and verifies correctness and authenticity of the system software, and operating system (OS) software stored in memory that comprises an application programming interface including an application programming interface portion that provides a software interface to the display unit.

14 Claims, 4 Drawing Sheets

U.S. PATENT DOCUMENTS

| | | | |
|---|---|---|---|
| 4,193,131 A | 3/1980 | Lennon et al. | 375/2 |
| 4,200,770 A | 4/1980 | Hellman et al. | 178/22 |
| 4,218,582 A | 8/1980 | Hellman et al. | 178/22 |
| 4,354,251 A | 10/1982 | Hellwig et al. | 364/900 |
| 4,355,390 A | 10/1982 | Hellwig et al. | 371/21 |
| 4,405,829 A | 9/1983 | Rivest et al. | 178/221 |
| 4,458,315 A | 7/1984 | Uchenick | 364/200 |
| 4,462,076 A | 7/1984 | Smith, III | 364/200 |
| 4,467,424 A | 8/1984 | Hedges et al. | 364/412 |
| 4,494,114 A | 1/1985 | Kaish | 340/825.31 |
| 4,519,077 A | 5/1985 | Amin | 371/21 |
| 4,525,599 A | 6/1985 | Curran et al. | 178/22.08 |
| 4,582,324 A | 4/1986 | Koza et al. | 273/138 A |
| 4,607,844 A | 8/1986 | Fullerton | 273/143 R |
| 4,652,998 A | 3/1987 | Koza et al. | 364/412 |
| 4,658,093 A | 4/1987 | Hellman | 380/25 |
| 4,727,544 A | 2/1988 | Brunner et al. | 371/21 |
| 4,752,068 A | 6/1988 | Endo | 273/1 E |
| 4,759,064 A | 7/1988 | Chaum | 380/30 |
| 4,817,140 A | 3/1989 | Chandra et al. | 380/4 |
| 4,837,728 A | 6/1989 | Barrie et al. | 364/412 |
| 4,845,715 A | 7/1989 | Francisco | 371/53 |
| 4,848,744 A | 7/1989 | Steininger et al. | 273/1 E |
| 4,856,787 A | 8/1989 | Itkis | 273/237 |
| 4,865,321 A | 9/1989 | Nakagawa et al. | 273/85 G |
| 4,911,449 A | 3/1990 | Dickinson et al. | 273/143 |
| 4,930,073 A | 5/1990 | Cina, Jr. | 364/300 |
| 4,944,008 A | 7/1990 | Piosenka et al. | 380/46 |
| 4,951,149 A | 8/1990 | Faroudja | 358/230 |
| 5,004,232 A | 4/1991 | Wong et al. | 273/435 |
| 5,021,772 A | 6/1991 | King et al. | 340/724 |
| 5,050,212 A | 9/1991 | Dyson | 380/25 |
| 5,103,081 A | 4/1992 | Fisher et al. | 235/464 |
| 5,109,152 A | 4/1992 | Takagi et al. | 235/380 |
| 5,146,575 A | 9/1992 | Nolan | 395/425 |
| 5,155,680 A | 10/1992 | Wiedemer | 364/406 |
| 5,155,768 A | 10/1992 | Matsuhara | 380/23 |
| 5,161,193 A | 11/1992 | Lampson et al. | 380/49 |
| 5,179,517 A | 1/1993 | Sarbin | 364/410 |
| 5,224,160 A | 6/1993 | Paulini et al. | 380/4 |
| 5,235,642 A | 8/1993 | Wobber et al. | 380/25 |
| 5,259,613 A | 11/1993 | Marnell, II | 273/138 A |
| 5,283,734 A | 2/1994 | Von Kohorn | 364/412 |
| 5,288,978 A | 2/1994 | Iijima | 235/380 |
| 5,291,585 A | 3/1994 | Sato et al. | 395/500 |
| 5,297,205 A | 3/1994 | Audebert et al. | 380/23 |
| 5,326,104 A | 7/1994 | Pease et al. | 273/138 A |
| 5,342,047 A | 8/1994 | Heidel et al. | 273/85 |
| 5,343,527 A | 8/1994 | Moore | 380/4 |
| 5,398,932 A | 3/1995 | Eberhardt et al. | 273/138 |
| 5,421,006 A | 5/1995 | Jablon et al. | 395/575 |
| 5,465,364 A | 11/1995 | Lathrop et al. | 395/700 |
| 5,488,702 A | 1/1996 | Byers et al. | 395/186 |
| 5,489,095 A | 2/1996 | Goudard et al. | 273/138 A |
| 5,507,489 A | 4/1996 | Reibel et al. | 273/138 A |
| 5,586,766 A | 12/1996 | Forte et al. | 273/309 |
| 5,586,937 A | 12/1996 | Menashe | 463/41 |
| 5,604,801 A | 2/1997 | Dolan et al. | 380/21 |
| 5,611,730 A | 3/1997 | Weiss | 463/20 |
| 5,643,086 A | 7/1997 | Alcorn et al. | 463/29 |
| 5,644,704 A | 7/1997 | Pease et al. | 395/183.18 |
| 5,655,965 A | 8/1997 | Takemoto et al. | 463/20 |
| 5,668,945 A | 9/1997 | Ohba et al. | 395/186 |
| 5,704,835 A | 1/1998 | Dietz, II | 463/20 |
| 5,707,286 A | 1/1998 | Carlson | 463/16 |
| 5,725,428 A | 3/1998 | Achmüller | 463/20 |
| 5,737,418 A | 4/1998 | Saffari et al. | 380/9 |
| 5,742,616 A | 4/1998 | Torreiter et al. | 371/22.4 |
| 5,759,102 A | 6/1998 | Pease et al. | 463/42 |
| 5,768,382 A | 6/1998 | Schneier et al. | 380/23 |
| 5,800,264 A | 9/1998 | Pascal et al. | 463/16 |
| 5,934,672 A | 8/1999 | Sines et al. | 273/143 R |
| 5,991,399 A | 11/1999 | Graunke et al. | 380/4 |
| 6,071,190 A | 6/2000 | Weiss et al. | 463/25 |
| 6,104,815 A | 8/2000 | Alcorn et al. | 380/251 |
| 6,106,396 A | 8/2000 | Alcorn et al. | 463/29 |
| 6,149,522 A | 11/2000 | Alcorn et al. | 463/29 |
| 6,195,587 B1 | 2/2001 | Hruska et al. | 700/2 |
| 6,620,047 B1* | 9/2003 | Alcorn et al. | 463/37 |
| 6,851,607 B1 | 2/2005 | Orus et al. | 235/380 |
| 2004/0002381 A1 | 1/2004 | Alcorn et al. | 463/37 |

FOREIGN PATENT DOCUMENTS

| | | |
|---|---|---|
| EP | 1 352 677 | 10/2003 |
| EP | 1 441 464 | 7/2004 |
| GB | 2 121 569 | 12/1983 |
| JP | 6-327831 | 11/1994 |
| JP | 7-31737 | 2/1995 |
| WO | 99/65579 | 12/1999 |
| WO | 00/33196 | 6/2000 |

OTHER PUBLICATIONS

Federal Information Processing Standards (FIPS) Publication 180 entitled "Secure Hash Standard" dated May 11, 1993, title page, abstract page and pp. 1-20.

Federal Information Processing Standards (FIPS) Publication 186 entitled "Digital Signature Standard (DSS)" dated May 19, 1994, 17 pages.

Document entitled "Fact Sheet on Digital Signature Standard" dated May 1994, 6 pages.

Federal Information Processing Standards (FIPS) Publication 180-1 entitled "Secure Hash Standard" dated Apr. 17, 1995, 2 title pages, abstract page and pp. 1-21.

Casino Journal of Nevada, Oct. 1996, pp. 64-66, 68-76, 78, 82, 84, 86, 88, 90, 92, 94, 96, 98, 145 and 146.

Answer and Counterclaims to Second Amended Complaint filed in connection with Civil Action No. CV-S-01-1498, pp. 1-26 and certificate of service page.

Bauspiess, et al., "Requirements For Cryptographic Hash Functions," *Computers and Security*, 5:427-437 (Sep. 11, 1992).

Complaint for patent infringement filed by Aristocrat Technologies, et al. dated Jan. 22, 2002, Civil Action No CV-S-02-0091.

Court docket for Civil Action No. CV-S-02-0091 listing papers filed.

Defendants' Supplemental Response to Plaintiffs' First Set of Interrogatories filed in connection with Civil Action No. CV-S-01-1498, pp. 1-3, 50-68 and 85-86.

Davida, G. et al., "Defending Systems Against Viruses through Cryptographic Authentication," Proceedings of the Symposium on Security and Privacy, *IEEE Comp. Soc. Press*, pp. 312-318 (May 1, 1989).

Hellman, Martin E., "The Mathematics of Public-Key Cryptography," Scientific American, vol. 241, No. 8, Aug. 1979, pp. 146-152 and 154-157.

Levinthal, et al., "The Silicon Gaming Odyssey Slot Macine," IEEE published Feb. 23, 1997, pp. 296-301.

Rivest, et al., "A Method for Obtaining Digital Signatures and Public-Key Cryptosystems," Communications of the ACM, vol. 21, No. 2, Feb. 1978, pp. 120-126.

\* cited by examiner

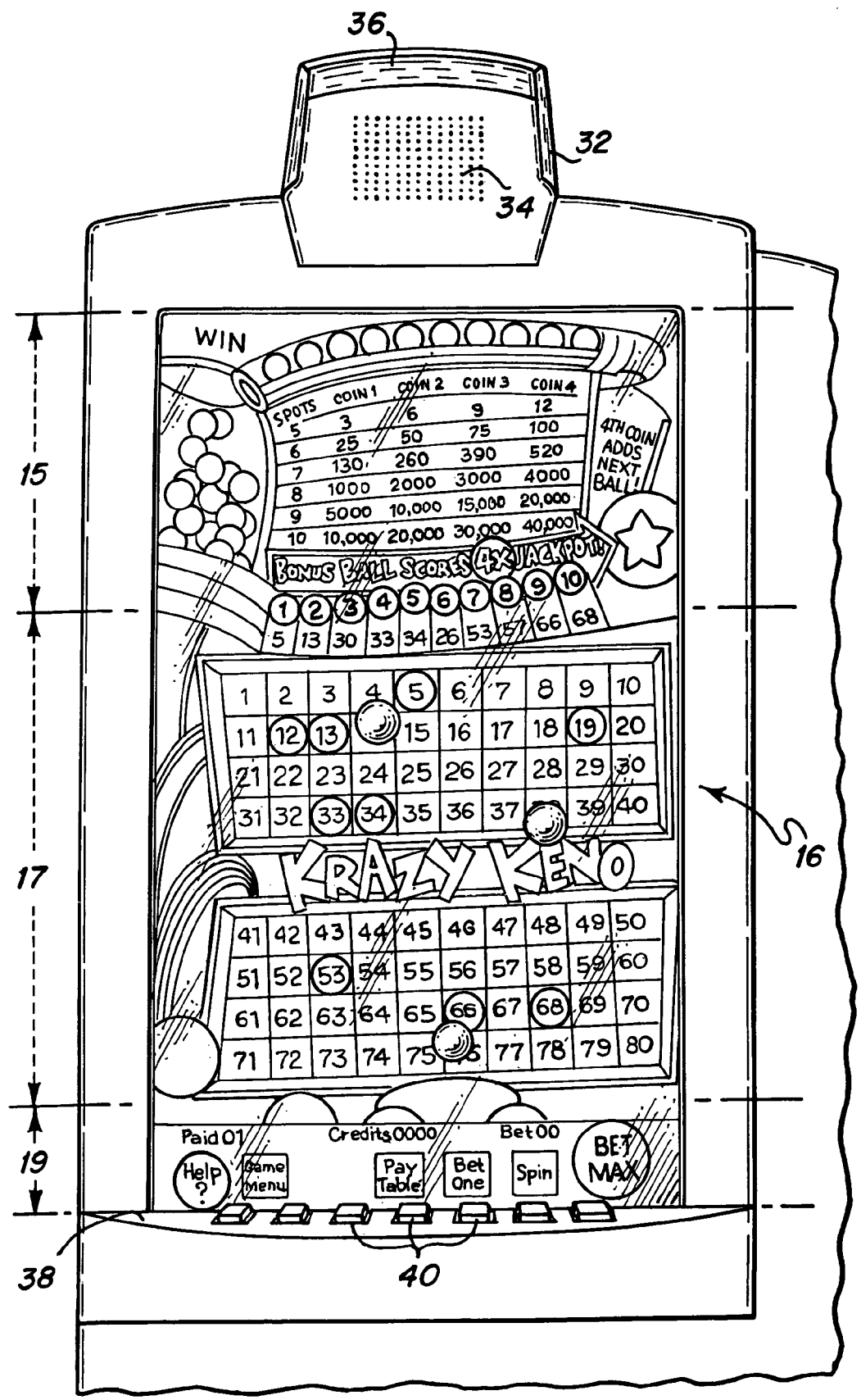
Fig_2

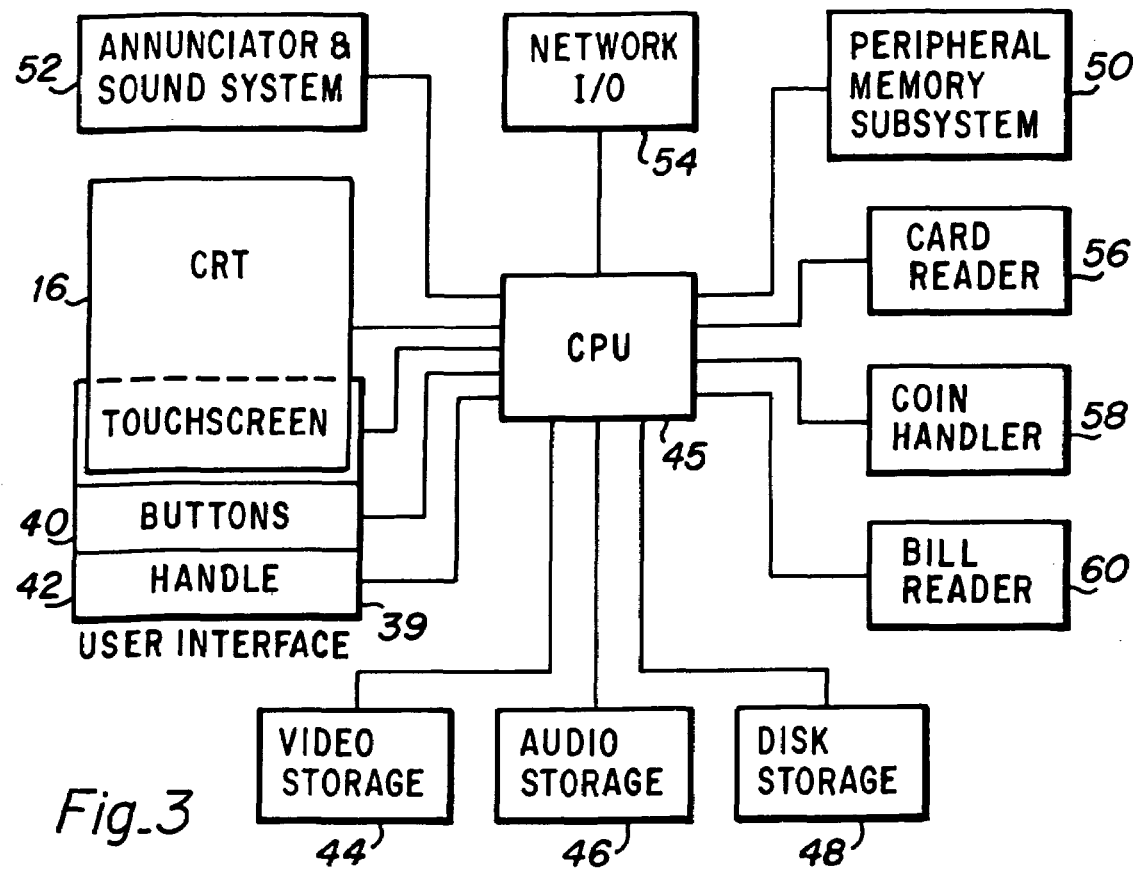
Fig_3
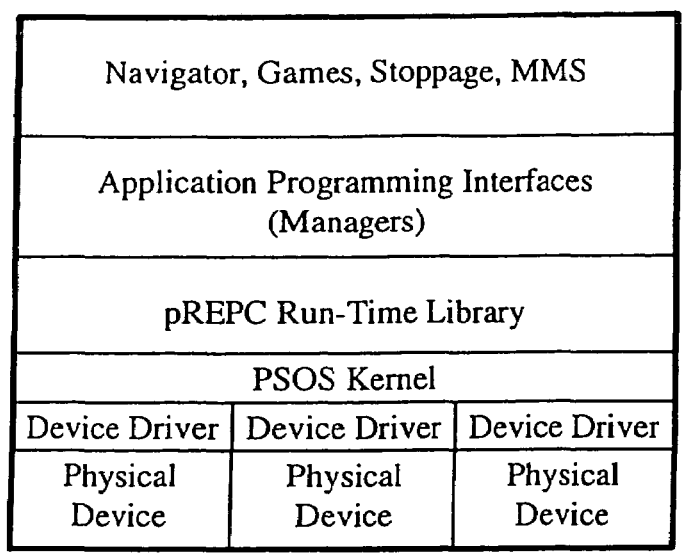
Fig_4

| Manager | Description |
|---|---|
| Data Streamer | Enables an application to use data within a large file without loading the entire file's contents into memory. |
| Display Manager | Enables an application to control screen drawing to the video display. |
| Cash Manager | Provides the application with a secure interface for monetary transactions. |
| Hotspot Manager | Provides the application interface to the touchscreen. |
| Button Manager | Provides the application interface to the hard buttons on the slot machine bezel. |

Fig_5

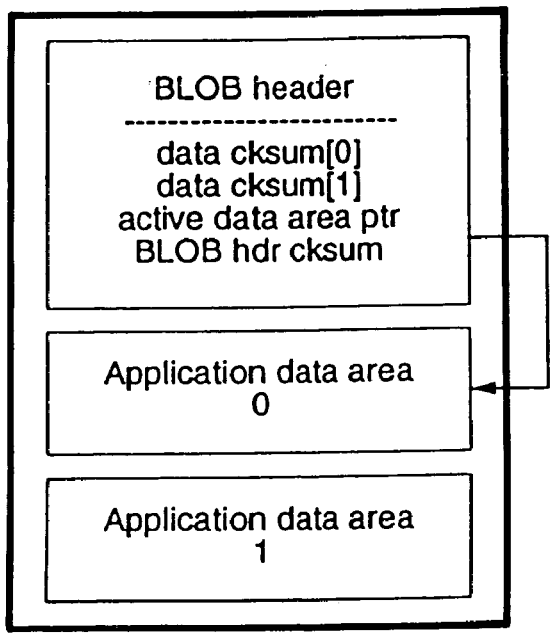

Fig_6

ELECTRONIC GAMING APPARATUS WITH AUTHENTICATION

This patent is a continuation of U.S. Ser. No. 09/677,129 filed in the Patent Office on Sep. 29, 2000 now U.S. Pat. No. 6,620,047, which is incorporated herein by reference in its entirety, which is a continuation of U.S. Ser. No. 08/864,700 filed in the Patent Office on May 28, 1997 and entitled "Improved Electronic Gaming Apparatus," now abandoned, and a continuation-in-part of U.S. Ser. No. 09/107,031 filed in the Patent Office on Jun. 29, 1998 and entitled "Method of Authenticating Game Data Sets in an Electronic Casino Gaming System," now U.S. Pat. No. 6,149,522, which is a continuation-in-part of U.S. Ser. No. 08/981,882 filed on Jun. 17, 1996 (as International Application No. PCT/US96/10463) and entitled "Electronic Casino Gaming System With Improved Play Capacity, Authentication and Security," now U.S. Pat. No. 6,106,396, which is a continuation-in-part of U.S. Ser. No. 08/497,662 filed in the Patent Office on Jun. 29, 1995 and entitled "Electronic Casino Gaming Apparatus With Improved Play Capacity, Authentication and Security," now U.S. Pat. No. 5,643,086.

BACKGROUND

This patent is directed to an electronic gaming machine of the type used in a casino.

Electronic gaming machines have long been provided for playing casino-type games such as roulette, poker, bingo, keno, lotto and various other games, and have historically been constructed in a slot machine format typically including a pay board wherein the winning pay-out combinations are displayed; a play section in which electronic or mechanical reels, card-playing indicia or other gaming objects are displayed; and a third area in which a player interface is provided by means of an assortment of buttons, switches, etc. More modern gaming machines have included a video display screen (CRT tube) that is driven by an image generator coupled to a microprocessor that serves as the game controller. In such video implementations, standard television-style cathode ray tubes have normally been used, and electronically generated reels, cards and other objects have been depicted thereon for implementing play of the game.

SUMMARY OF THE INVENTION

In one aspect, the invention is directed to a gaming machine comprising a cabinet, at least one user-interface button, a value-receiving mechanism associated with the cabinet, a display unit associated with the cabinet, and a processor disposed in the cabinet and operatively coupled to the user-interface button, the value-receiving mechanism and the display unit. The gaming machine additionally comprises a read-only memory disposed in the cabinet, basic input/output system (BIOS) software stored in the read-only memory, a nonvolatile memory capable of storing critical system data, critical data storage software that causes critical system data to be stored in the nonvolatile memory, read/write memory disposed in the cabinet and operatively coupled to the processor, and system software stored in the read/write memory that comprises software representing a game that may be played by a player.

The gaming machine further comprises encoded data stored in the read/write memory having been generated from at least one message digest that was generated based on using an encoding function with the system software, loading software stored in memory that loads system software from the read/write memory into random-access memory and verifies correctness and authenticity of the system software based on a comparison of data generated from the encoded data and data generated from the system software, and operating system (OS) software stored in memory that comprises an application programming interface including an application programming interface portion that provides a software interface to the display unit.

Additional aspects of the invention are defined by the claims of the patent.

BRIEF DESCRIPTION OF THE DRAWINGS

FIG. 2 depicts a typical screen display in accordance with the present invention;

FIG. 3 is a functional block diagram illustrating the principal functional components used in the gaming machine of the present invention; and FIGS. 4, 5 and 6 are diagrams generally illustrating software architecture and features of the preferred embodiment.

DETAILED DESCRIPTION OF VARIOUS EMBODIMENTS

Figure 1:
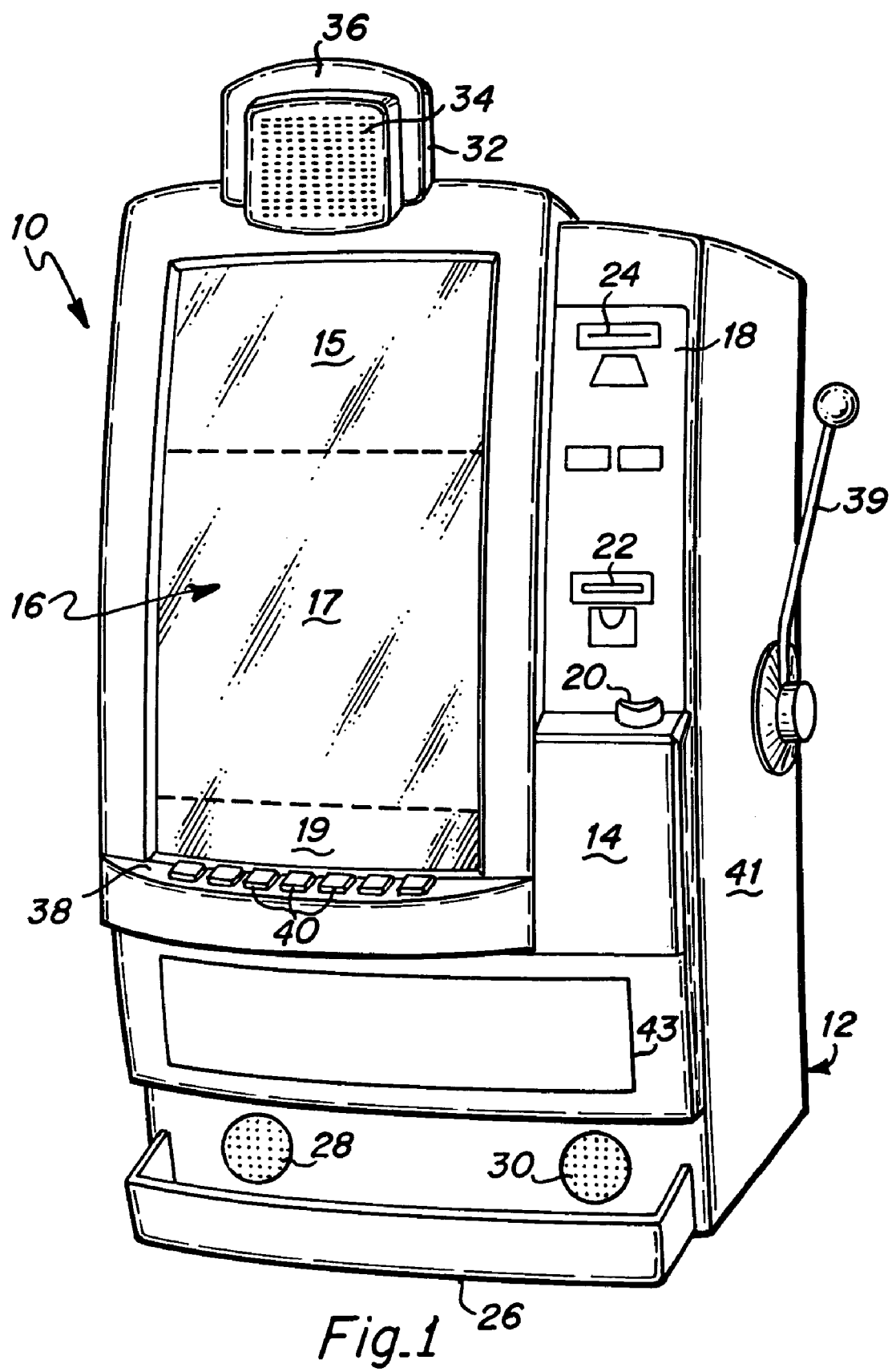
FIG. 1 is a perspective view illustrating a gaming machine in accordance with the present invention.

A preferred embodiment of the present invention is depicted at 10 in FIG. 1 and includes a more or less rectangularly configured cabinet 12 forming an enclosure for the various functional mechanical, electrical and electronic components. The front face 14 of cabinet 12 is uniquely configured to include as the principal component thereof a video display screen 16 disposed in portrait format with its vertical dimension being substantially larger than its horizontal dimension. As is apparent from the illustration, the screen 16 occupies a substantial part of the front face of the device 10. Positioned to the right of screen 16 is a currency input section 18 including a coin-receiving slot 20, a paper money-receiving slot 22, and a credit/debit card slot 24. A pair of buttons 23 and 25 may be provided for allowing the player to select a "cash" or "credit" mode for payout of winnings.

Disposed beneath screen 16 and at the bottom of the front face is a coin drop receptacle 26. Immediately above the coin drop receptacle are a pair of high-quality audio speakers 28 and 30. Above screen 16 is an annunciator 32 including a third high-quality audio speaker or signal generator 34 and a multi-colored, multi-light display apparatus 36. Disposed immediately beneath screen 16 on a slightly protruding shelf 38 are a plurality of user interface buttons 40 that are of conventional configuration. Formed integral with the front face of display screen 16 is a transparent touch screen that is dynamically configurable to allow manual user inputs at screen positions determined by the software associated with the particular game or attract mode being presented.

On the right side of cabinet 12 is a conventional pull handle 39 that may be optionally used as a part of the user interface to the gaming apparatus.

The cabinet 12 was designed to coincide with the overall dimensions of traditional slot machines so that the device can be placed in existing casino carousels without requiring reconfiguration of the stands or machine layouts. The right side of the cabinet forms a compartment for containing currency input devices such as coin and bill acceptors, a card reader, keypad, and perhaps a display for a player tracking network interface. A locked service door 41 forms the right side wall of the cabinet and allows access to the currency components in this section. The front 43 of the lower section of the enclosure contains a coin hopper (a cache of coins that is used to pay out the player's winnings when playing in cash mode). The back of the lower section of the cabinet (behind the hopper) contains a CPU box with all of the associated electronics and power supplies. A locked service door allows access to the hopper in this section.

Player tracking network electronics are located in the top of the system and are accessed by removing a top cover (not shown).

The cabinet layout, which is more or less traditional for video-type slot machines, leaves a tall and narrow section at the upper left for the CRT that forms the display screen 16. To maximize the screen area in the available space, a 26", wide screen CRT display device rotated 90° into a "portrait mode" is used with the screen origin at the bottom left corner, and the image scanned from left to right. For purposes of this disclosure "portrait mode" is defined as a display configuration in which a display screen has a height dimension that is substantially larger than its width dimension. The wide screen CRT has a 16×9 (height to width) aspect ratio and a 0.69 mm dot pitch allowing for an 856×480 visible display area. Portrait mode configured display screens or CRTs having other aspect ratios may also be used. For example, although less desirable, a standard 4×3 CRT monitor rotated into a portrait mode could be used.

When operating in a game play mode, the display screen may be electronically subdivided into three arbitrarily sized regions: an upper region 15 in which a pay board will be displayed, setting forth the jackpot payouts as a function of the coins input; a mid region 17 in which a game board, play reels, card hands, or other game play indicia is displayed; and a lower region 19 in which touch screen "buttons" are displayed for facilitating player selection of various input functions such as "hold," "bet 1," "draw," etc. One example of a "3-way" screen configuration is illustrated in FIG. 2. Depending on the particular game being played, the dimensions of these regions may change. Furthermore, the configuration of the touch screen responsive areas within each region may likewise change to correspond to associated graphics displayed in one ore more of the regions. Moreover, in "attract mode" the screen may be subdivided into a geometrically grid of regions, e.g., a 2×4 or 2×6 (etc.) grid in which passive or active game logos may be simultaneously displayed for selection by a player. In such mode the touch screen would typically be configured to call up the game corresponding to the logo touched by the player.

An integrated touch screen overlaying the display screen, along with the series of "hard" buttons 40 arrayed along the bottom edge of the display, provide the main player interface to the system.

In FIG. 3 of the drawing, a generalized block diagram depicts the principal functional components of the system and includes a central processing unit (CPU) 45, the CRT 16, a user interface 42 that includes the touch screen buttons 40 and pull handle 39, a video storage subsystem 44, an audio storage subsystem 46, a disk storage subsystem 48, a peripheral memory subsystem 50, an annunciator and sound system 52, a network I/O 54, a card reader 56, a coin handler 58, and a bill reader 60. In the preferred embodiment, CPU 45 is a 133 MHz Pentium processor using a combination of the DUCK video Codec for motion video, A-RL (Alpha Run-Length) decoding of static graphics, and software compositing for the individual elements.

Although not shown in detail herein, the system includes a motherboard, a PCI-based video board and SCSI controller, a peripheral memory board, a general purpose input/output (GPIO) board, a power transformer, a disk drive, and a CPU power supply. The peripheral memory board is installed on the mother board PCI bus and is used to replace the BIOS ROMs of the standard PC architecture. Whereas on the standard mother boards the PCI-to-ISA bridge (PIB) chip provides the interface to the system BIOS ROMs by subtractive decoding of PCI accesses in the normal PCI BIOS range and its high-memory aliases, the peripheral memory board in the preferred embodiment responds to accesses to the BIOS address range using positive decoding, responding to the requested cycles before the PIB chip responds. This allows the ROM-based BIOS and OS to reside at these locations without modifying the mother board.

In addition, the peripheral memory board provides a removable subsystem containing all of the machine states, thereby allowing secure system auditing. The peripheral memory board contains 1 MB of EPROM to hold the BIOS and OS (including the secure loader described below), 64 KB of nonvolatile RAM to implement a SafeStore system, and 128 KB of electrically erasable PROM (EEPROM) to store the system configuration.

A peripheral memory controller performs byte-assembly and disassembly on memory reads/writes and parity generation on the PCI reads.

The preferred embodiment exhibits total immunity to Electric-Static Discharge (ESD) to a level of 27 KV. The requirement for this level of ESD immunity is an artifact of low humidity and prevalence of synthetic materials (carpeting, etc.) in Nevada casinos. All standard mother boards support an IEEE 1284 compatible parallel port, and such port provides the interface to the GPIO board. The GPIO board provides an electrically isolated interface to the external device ports and maps them to registers accessible through the mother board parallel port.

The system software is designed to address the unique requirements of casino gaming machines, including high reliability and security, fault detection and recovery, and responsive performance. The system software architecture is illustrated in FIG. 4.

A pSOS real-time operating system serves as the basis for the software platform of the preferred embodiment. This pSOS system consists of a multi-tasking kernel, the pREPC, ANSI-C, run-time library function, and a driver support library to access physical devices through a set of device drivers. The run-time Application Programming Interface (API) is a layer of system software providing a set of standard functions that application programmers develop to. Because the API provides a layer of abstraction between the applications and the hardware, the applications are not affected if the hardware or lower level system software are modified. The API is divided into a series of managers, each of which provides either access to some physical device or provides some set of services for the programmer. Examples of these managers are shown in the table illustrated in FIG. 5.

The system applications include a Navigator, Play Stoppage, a suite of games, and the Machine Management System. The Navigator presents the player with an animated icon of each game. The animation describes the key features of the game; users enter a game by touching its icon. Each game is a custom application offering a specific set of propositions to the player. Each game is accompanied by on-line help that describes the rules of play, general disclaimers for the game, and so on. Play Stoppage is an application that runs short animations or video segments that entertain the player if a system fault occurs, while communicating information about why a game was interrupted and when it will be returned to play. The Machine Management System (MMS) provides a graphical interface to all technical support functions of the slot machine. This includes player conflict resolution, accounting, product configuration, and machine diagnostics.

As described in detail in the above-referenced U.S. patent application Ser. No. 08/497,662, before software can be loaded from the hard disk, it must be verified as being an authentic proprietary product. A secure loader is the system software component that loads executable files from the disk subsystem into RAM, verifies that the contents are correct, and then executes the image. The secure loader is based on the use of two-key cryptographic authentication from RSA Data Security, Inc. of Redwood City, Calif.

When a software release is ready for shipment, a HASH function designed for cryptographic use generates a unique fixed-length string of 128 bits for the loadable code image. This string, called a message digest, is then encrypted using RSA software and the proprietor's private key to produce a digital signature for the image. The signature is then written to disk with the loadable code image. When the code image is loaded from the disk and is ready to be executed during the system boot sequence, the secure loader decrypts the digital signature using the public key stored in ROM. The secure loader verifies that the image is authentic by comparing the message digest computed for the loadable code image with the message digest decrypted from disk. The software can be authenticated at any time since the console diagnostics include tools that allow the operator to query all loadable applications and run the RSA verification algorithm on them on demand. The authentication process is not limited to just software images. Graphics files or any binary data set can be authenticated. Because the graphics images are so large, they are not verified every time a game is loaded. If needed, critical graphic images such as the faces of cards can be verified before initial use in a game.

A SafeStore application provides fault-tolerant storage for critical system data called safe objects stored in system nonvolatile SRAM. To facilitate recovery of information after a crash or system failure, state information about each safe object along with the object data is saved in an internal format known as a binary large object (BLOB). To protect against hardware or software faults corrupting SafeStore, all safe objects are mirrored across two independent nonvolatile SRAMs. If corruption occurs by hard or soft failures to indicate locations in SRAM, or if complete SRAM failures occur, SafeStore will detect this corruption and recover the data.

FIG. 6 depicts a BLOB in SafeStore with all of the important BLOB header fields. The data check sum fields 0 and 1 contain the check sums of the data in data areas 0 and 1, respectively. The active data area pointer field indicates that data area 0 contains the latest data written to SafeStore. The BLOB header check sum field contains a check sum of the BLOB header, including the data area check sums and the data area pointer. During a SafeStore update, the BLOB header is read into main memory where the header check sum is computed and checked against the value of the header check sum field. If the check sum does not match, the system will tilt. Assuming it matches, the new data is copied into the inactive data area. The copy of the BLOB header in main memory is updated with the check sum of the new data; the active data area pointer is updated to point to the data area 1; and the new header check sum is computed and written to SafeStore.

Although the present invention has been described above in terms of specific embodiments, it is anticipated that alterations and modifications thereof will no doubt become apparent to those skilled in the art. For example, it is contemplated that video screens formed by other apparatus such as liquid crystal displays, field emission displays, interference element displays, projection TV, and perhaps holographic and other display technology may be used in place of the CRT device presently used in the preferred embodiment. Furthermore, other cabinet configurations and designs may be used to support a large portrait-mode display screen, and whereas the preferred embodiment utilizes a single means to form the display screen, it is contemplated that a similar result may be achieved by using a plurality of contiguous display devices synchronously driven to display different portions of a common image.

What is claimed is:

1. A gaming machine, comprising:
   a cabinet;
   at least one user-interface button;
   a value-receiving mechanism associated with said cabinet;
   a value-dispensing mechanism associated with said cabinet;
   a video display unit associated with said cabinet;
   a touch-sensitive device associated with said video display unit;
   a processor disposed in said cabinet and operatively coupled to said user-interface button, said value-receiving mechanism, said video display unit and said touch-sensitive device;
   a read-only memory disposed in said cabinet;
   basic input/output system (BIOS) software stored in said read-only memory;
   a nonvolatile memory capable of storing critical system data;
   critical data storage software that causes critical system data to be stored in said nonvolatile memory;
   disk memory disposed in said cabinet and operatively coupled to said processor;
   system software stored in said disk memory, said system software comprising:
      a first software portion representing a first game that may be played by a player;
      a second software portion representing a second game that may be played by a player; and
      a third software portion that causes a first icon representing said first game and a second icon representing said second game to be generated on said video display unit, said third software portion causing one of said first and second games to be initiated in response to a player touching one of said first and second icons;
   encoded data stored in said disk memory, said encoded data having been generated from at least one message digest that was generated based on using an encoding function with said system software;
   secure loading software stored in memory that loads system software from said disk memory into random-access memory and verifies correctness and authenticity of said system software, said secure loading software verifying correctness and authenticity of said system software based on a comparison of data generated from said encoded data and data generated from said system software; and operating system (OS) software stored in memory, said operating system software comprising an application programming interface including a first application programming interface portion that provides a software interface to said video display unit and a second application programming interface portion that provides a software interface to said touch-sensitive device, wherein said encoded data comprises data that was generated by encrypting at least one message digest that was generated based on using a Hash function on said system software, and wherein said secure loading software verifies correctness and authenticity of said system software based on a comparison of data generated by decoding said encoded data and at least one message digest generated from said system software.

2. A gaming machine as defined in claim 1 wherein said value-receiving mechanism comprises a coin-receiving slot.

3. A gaming machine as defined in claim 1 wherein said value-receiving mechanism comprises a paper money-receiving slot.

4. A gaming machine as defined in claim 1 wherein said value-receiving mechanism comprises a credit/debit card slot.

5. A gaming machine as defined in claim 1 wherein said value-dispensing mechanism comprises a coin hopper.

6. A gaming machine, comprising:
a cabinet;
at least one user-interface button;
a value-receiving mechanism associated with said cabinet;
a display unit associated with said cabinet;
a processor disposed in said cabinet and operatively coupled to said user-interface button, said value-receiving mechanism and said display unit;
a read-only memory disposed in said cabinet;
basic input/output system (BIOS) software stored in said read-only memory;
a nonvolatile memory capable of storing critical system data;
critical data storage software that causes critical system data to be stored in said nonvolatile memory;
read/write memory disposed in said cabinet and operatively coupled to said processor;
system software stored in said read/write memory, said system software comprising software representing a game that may be played by a player;
encoded data stored in said read/write memory, said encoded data having been generated from at least one message digest that was generated based on using an encoding function with said system software;
loading software stored in memory that loads system software from said read/write memory into random-access memory and verifies correctness and authenticity of said system software, said loading software verifying correctness and authenticity of said system software based on a comparison of data generated from said encoded data and data generated from said system software; and
operating system (OS) software stored in memory, said operating system software comprising an application programming interface including an application programming interface portion that provides a software interface to said display unit.

7. A gaming machine as defined in claim 6 wherein said encoded data was generated from at least one message digest that was generated based on using a Hash function with said system software.

8. A gaming machine as defined in claim 6 wherein said encoded data comprises data that was generated by encrypting at least one message digest that was generated based on using a Hash function on said system software.

9. A gaming machine as defined in claim 6 wherein said loading software verifies correctness and authenticity of said system software based on a comparison of data generated by decoding said encoded data and at least one message digest generated from said system software.

10. A gaming machine as defined in claim 6,
wherein said encoded data was generated by encrypting at least one message digest that was generated from said system software, and
wherein said loading software verifies correctness and authenticity of said system software based on a comparison of data generated by decrypting said encoded data and at least one message digest generated from said system software.

11. A gaming machine as defined in claim 6 wherein said value-receiving mechanism comprises a coin-receiving slot.

12. A gaming machine as defined in claim 6 wherein said value-receiving mechanism comprises a paper money-receiving slot.

13. A gaming machine as defined in claim 6 wherein said value-receiving mechanism comprises a credit/debit card slot.

14. A gaming machine as defined in claim 6 wherein said read/write memory comprises a disk memory.

* * * * *

(12) EX PARTE REEXAMINATION CERTIFICATE (6708th)
United States Patent
Alcorn et al.

(10) Number: US 7,063,615 C1
(45) Certificate Issued: *Mar. 17, 2009

(54) ELECTRONIC GAMING APPARATUS WITH AUTHENTICATION

(75) Inventors: Allan E. Alcorn, Portola Valley, CA (US); Harry H. Jenkins, Knoxville, TX (US)

(73) Assignee: IGT, Reno, NV (US)

Reexamination Request:
No. 90/008,958, Dec. 10, 2007

Reexamination Certificate for:
| | |
|---|---|
| Patent No.: | 7,063,615 |
| Issued: | Jun. 20, 2006 |
| Appl. No.: | 10/601,465 |
| Filed: | Jun. 23, 2003 |

(*) Notice: This patent is subject to a terminal disclaimer.

Related U.S. Application Data

(63) Continuation of application No. 09/677,129, filed on Sep. 29, 2000, now Pat. No. 6,620,047, which is a continuation of application No. 08/864,700, filed on May 28, 1997, now abandoned, and a continuation-in-part of application No. 09/107,031, filed on Jun. 29, 1998, now Pat. No. 6,149,522, which is a continuation-in-part of application No. 08/981,882, filed as application No. PCT/US96/10463 on Jun. 17, 1996, now Pat. No. 6,106,396, which is a continuation-in-part of application No. 08/497,662, filed on Jun. 29, 1995, now Pat. No. 5,643,086.

(51) Int. Cl.
*A63F 9/24* (2006.01)

(52) U.S. Cl. ............ 463/1; 463/20; 463/37; 273/143 R

(58) Field of Classification Search ............ None
See application file for complete search history.

(56) References Cited

U.S. PATENT DOCUMENTS

| | | |
|---|---|---|
| 3,825,905 A | 7/1974 | Allen, Jr. |
| 3,838,264 A | 9/1974 | Maker |
| 4,193,131 A | 3/1980 | Lennon et al. |
| 4,200,770 A | 4/1980 | Hellman et al. |
| 4,218,582 A | 8/1980 | Hellman et al. |

(Continued)

FOREIGN PATENT DOCUMENTS

| | | |
|---|---|---|
| EP | 0 685 246 | 12/1995 |
| EP | 1 352 677 | 10/2003 |
| EP | 1 441 464 | 7/2004 |
| GB | 2 121 569 | 12/1983 |
| GB | 2121569 B | 7/1986 |
| JP | HEI 1-120654 | 5/1989 |
| JP | HEI 4-163627 | 6/1992 |
| JP | 6-327831 | 11/1994 |
| JP | 7-31737 | 2/1995 |
| JP | HEI 7-129207 | 5/1995 |
| WO | WO 99/65579 | 12/1999 |
| WO | WO 00/33196 | 6/2000 |

OTHER PUBLICATIONS

Davida, G. et al., "Defending Systems Against Viruses through Cryptographic Authentication," Proceedings of the Symposium on Security and Privacy, *IEEE Comp. Soc. Press*, pp. 312–318 (May 1–3, 1989) XP000041247.

(Continued)

*Primary Examiner*—Peter C. English

(57) ABSTRACT

A gaming machine is provided with a cabinet, at least one user-interface button, a value-receiving mechanism associated with the cabinet, a display unit associated with the cabinet, a processor disposed in the cabinet, system software representing a game that may be played by a player, encoded data generated from at least one message digest that was generated based on using an encoding function with the system software, loading software stored in memory that loads system software into random-access memory and verifies correctness and authenticity of the system software, and operating system (OS) software stored in memory that comprises an application programming interface including an application programming interface portion that provides a software interface to the display unit.

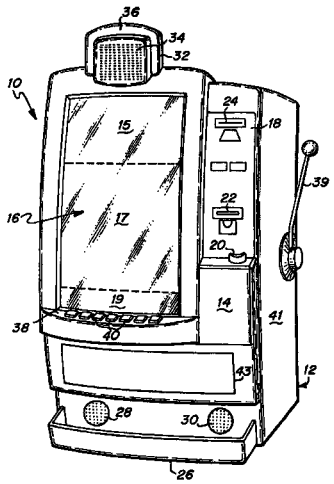

U.S. PATENT DOCUMENTS

| | | |
|---|---|---|
| 4,354,251 A | 10/1982 | Hellwig et al. |
| 4,355,390 A | 10/1982 | Hellwig et al. |
| 4,405,829 A | 9/1983 | Rivest et al. |
| 4,458,315 A | 7/1984 | Uchenick |
| 4,462,076 A | 7/1984 | Smith, III |
| 4,467,424 A | 8/1984 | Hedges et al. |
| 4,494,114 A | 1/1985 | Kaish |
| 4,519,077 A | 5/1985 | Amin |
| 4,525,599 A | 6/1985 | Curran et al. |
| 4,582,324 A | 4/1986 | Koza et al. |
| 4,607,844 A | 8/1986 | Fullerton |
| 4,652,998 A | 3/1987 | Koza et al. |
| 4,658,093 A | 4/1987 | Hellman |
| 4,727,544 A | 2/1988 | Brunner et al. |
| 4,752,068 A | 6/1988 | Endo |
| 4,759,064 A | 7/1988 | Chaum |
| 4,817,140 A | 3/1989 | Chandra et al. |
| 4,837,728 A | 6/1989 | Barrie et al. |
| 4,845,715 A | 7/1989 | Francisco |
| 4,848,744 A | 7/1989 | Steininger et al. |
| 4,856,787 A | 8/1989 | Itkis |
| 4,865,321 A | 9/1989 | Nakagawa et al. |
| 4,911,449 A | 3/1990 | Dickinson et al. |
| 4,930,073 A | 5/1990 | Cina, Jr. |
| 4,944,008 A | 7/1990 | Piosenka et al. |
| 4,951,149 A | 8/1990 | Faroudja |
| 5,004,232 A | 4/1991 | Wong et al. |
| 5,021,772 A | 6/1991 | King et al. |
| 5,050,212 A | 9/1991 | Dyson |
| 5,103,081 A | 4/1992 | Fisher et al. |
| 5,109,152 A | 4/1992 | Takagi et al. |
| 5,146,575 A | 9/1992 | Nolan |
| 5,155,680 A | 10/1992 | Wiedemer |
| 5,155,768 A | 10/1992 | Matsuhara |
| 5,161,193 A | 11/1992 | Lampson et al. |
| 5,179,517 A | 1/1993 | Sarbin et al. |
| 5,224,160 A | 6/1993 | Paulini et al. |
| 5,224,706 A | 7/1993 | Bridgeman et al. |
| 5,235,642 A | 8/1993 | Wobber et al. |
| 5,259,613 A | 11/1993 | Marnell |
| 5,283,734 A | 2/1994 | Von Kohorn |
| 5,288,978 A | 2/1994 | Iijima |
| 5,291,585 A | 3/1994 | Sato et al. |
| 5,297,205 A | 3/1994 | Audebert et al. |
| 5,326,104 A | 7/1994 | Pease et al. |
| 5,342,047 A | 8/1994 | Heidel et al. |
| 5,343,527 A | 8/1994 | Moore |
| 5,398,932 A | 3/1995 | Eberhardt et al. |
| 5,421,006 A | 5/1995 | Jablon et al. |
| 5,465,364 A | 11/1995 | Lathrop et al. |
| 5,488,702 A | 1/1996 | Byers et al. |
| 5,489,095 A | 2/1996 | Goudard et al. |
| 5,507,489 A | 4/1996 | Reibel et al. |
| 5,586,766 A | 12/1996 | Forte et al. |
| 5,586,937 A | 12/1996 | Menashe |
| 5,604,801 A | 2/1997 | Dolan et al. |
| 5,611,730 A | 3/1997 | Weiss |
| 5,643,086 A | 7/1997 | Alcorn et al. |
| 5,644,704 A | 7/1997 | Pease et al. |
| 5,655,965 A | 8/1997 | Takemoto et al. |
| 5,668,945 A | 9/1997 | Ohba et al. |
| 5,704,835 A | 1/1998 | Dietz, II |
| 5,707,286 A | 1/1998 | Carlson |
| 5,725,428 A | 3/1998 | Achmuller |
| 5,737,418 A | 4/1998 | Saffari et al. |
| 5,742,616 A | 4/1998 | Torreiter et al. |
| 5,759,102 A | 6/1998 | Pease et al. |
| 5,768,382 A | 6/1998 | Schneier et al. |
| 5,800,264 A | 9/1998 | Pascal et al. |
| 5,934,672 A | 8/1999 | Sines et al. |
| 5,991,399 A | 11/1999 | Graunke et al. |
| 6,071,190 A | 6/2000 | Weiss et al. |
| 6,104,815 A | 8/2000 | Alcorn et al. |
| 6,106,396 A | 8/2000 | Alcorn et al. |
| 6,149,522 A | 11/2000 | Alcorn et al. |
| 6,195,587 B1 | 2/2001 | Hruska et al. |
| 6,620,047 B1 | 9/2003 | Alcorn et al. |
| 6,851,607 B2 | 2/2005 | Orus et al. |
| 2004/0002381 A1 | 1/2004 | Alcorn et al. |

OTHER PUBLICATIONS

Document entitled "Fact Sheet on Digital Signature Standard" dated May 1994, 6 pages.

Federal Information Processing Standards (FIPS) Publication 180–1 entitled "Secure Hash Standard" dated May 17, 1995, 2 title pages, abstract page and pp. 1–21.

Federal Information Processing Stabdards (FIPS) Publication 180 entitled "Secure Hash Standard" dated May 11, 1993, title page, abstract page and pp. 1–20.

Federal Information Processing Standards (FIPS) Publication 186 entitled "Digital Signature Standard (DSS)" dated May 19, 1994, 17 pages.

Hellman, Martin E., "The Mathematics of Public–Key Cryptography," Scientific American, vol. 241, No. 8, Aug. 1979, pp. 146–152 and 154–157.

Rivest, et al., "A Method for Obtaining Digital Signatures and Public–Key Cryptosystems," Communications of the ACM, vol. 21, No. 2, Feb. 1978, pp. 120–126.

Bakhtiari et al., Cryptographic Hash Functions: A Survey, 1995, Centre for Computer Security Research, pp. 1–26.

Bauspiess, et al., "Requirements For Cryptographic Hash Functions," *Computers and Security*, 5:427–437 (Sep. 11, 1992).

Casino Journal of Nevada, Oct. 1996, pp. 64–66, 68–76, 78, 82, 84, 86, 88, 90, 92, 94, 96 98, 145 and 146.

Levinthal, et al., "The Silicon Gaming Odyssey Slot Machine," IEEE published Feb. 23, 1997, pp. 296–301.

Gasser, Morrie; Le Roux, Yves; Lipner, Steve, The Digital Distributed System Security Architecture, Securicom 90, Mar. 14–16, 1990, 8th Worldwide Congress on Computer and Communications Security and Protection.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

Claim 6 is determined to be patentable as amended.

Claims 7–14, dependent on an amended claim, are determined to be patentable.

New claim 15 is added and determined to be patentable.

6. A gaming machine, comprising;
a cabinet;
at least one user-interface button;
a value-receiving mechanism associated with said cabinet;
a display unit associated with said cabinet;
a processor disposed in said cabinet and operatively coupled to said user-interface button, said value-receiving mechanism and said display unit;
a read-only memory disposed in said cabinet;
basic input/output system (BIOS) software stored in said read-only memory;
a nonvolatile memory capable of storing critical system data;
critical data storage software that causes critical system data to be stored in said nonvolatile memory;
read/write memory disposed in said cabinet and operatively coupled to said processor;
system software stored in said read/write memory, said system software comprising software representing a game that may be played by a player;
encoded data stored in said read/write memory, said encoded data having been generated from at least one message digest that was generated based on using an encoding function with said system software;
loading software stored in memory that loads system software from said read/write memory into random-access memory and verifies correctness and authenticity of said system software, said loading software verifying correctness and authenticity of said system software based on a comparison of data generated from said encoded data and data generated from said system software *wherein, in response to an event generated while the gaming machine is available for game play, the system software is authenticated*; and
operating system (OS) software stored in memory, said operating system software comprising an application programming interface including an application programming interface portion that provides a software interface to said display unit.

*15. A gaming machine, comprising;*
*a cabinet;*
*at least one user-interface button;*
*a value-receiving mechanism associated with said cabinet;*
*a display unit associated with said cabinet;*
*a processor disposed in said cabinet and operatively coupled to said user-interface button, said value-receiving mechanism and said display unit;*
*a read-only memory disposed in said cabinet;*
*basic input/output system (BIOS) software stored in said read-only memory;*
*a nonvolatile memory capable of storing critical system data;*
*critical data storage software that causes critical system data to be stored in said nonvolatile memory;*
*read/write memory disposed in said cabinet and operatively coupled to said processor;*
*system software stored in said read/write memory, said system software comprising software representing a game that may be played by a player;*
*encoded data stored in said read/write memory, said encoded data having been generated from at least one message digest that was generated based on using an encoding function with said system software;*
*loading software stored in memory that loads system software from said read/write memory into random-access memory and verifies correctness and authenticity of said system software, said loading software verifying correctness and authenticity of said system software based on a comparison of data generated from said encoded data and data generated from said system software wherein, while the gaming machine is available for game play, the system software is authenticated; and*
*operating system (OS) software stored in memory, said operating system software comprising an application programming interface including an application programming interface portion that provides a software interface to said display unit.*

\* \* \* \* \*